UNITED STATES PATENT OFFICE.

LYMAN DEE PETTIT, OF EVERETT, WASHINGTON, ASSIGNOR TO PACIFIC LUBRICATING COMPANY, A CORPORATION.

LUBRICANT FOR WHEELS.

1,081,059.  Specification of Letters Patent.  Patented Dec. 9, 1913.

No Drawing.  Application filed May 20, 1909.  Serial No. 497,339.

*To all whom it may concern:*

Be it known that I, LYMAN DEE PETTIT, a citizen of the United States, residing at Everett, in the county of Snohomish, State of Washington, have invented a new and useful Composition of Matter to be Used as a Lubricant for Wheels, of which the following is a specification.

My composition consists of crude petroleum, water, unslaked lime, bicarbonate of soda, petroleum distillate or kerosene, and rosin, combined in the manner and proportions stated.

I first make a lime putty by slaking fifty pounds of lime and thoroughly incorporating therein one pound of bicarbonate of soda. I then combine crude rosin and oil by dissolving one hundred pounds of the rosin in three gallons of gasolene or petroleum distillate; or by melting the rosin and while in a liquid state adding three gallons of kerosene.

The above described lime putty, water, and crude petroleum, in the proportion of one gallon of lime putty, four gallons of water, and four gallons of crude petroleum, are thoroughly commingled by agitation, and one gallon of the above mentioned rosin oil compound is then added and the entire mass thoroughly stirred until it thickens, when the lubricant is ready for use. A lubricant suitable for machinery is made in the same manner but a finer grade of oil is used instead of that specified herein.

I claim as my invention:

1. A lubricant having as ingredients commingled petroleum, water, and freshly slaked lime containing a small percentage of bicarbonate of soda, all intimately mixed with rosin dissolved in gasolene.

2. A lubricant having as ingredients brought together in its manufacture, in volume percentages as follows, viz: crude petroleum, 40%; water, 40%; unslaked lime containing approximately two per cent. of bicarbonate of soda, 10%; and rosin dissolved in petroleum distillate, 10%.

LYMAN DEE PETTIT.

Witnesses:
SCHUYLER DURYEE,
D. MIDDEKE.